Sept. 24, 1957 E. H. GATZERT 2,807,673

SPECIAL SERVICE TRUNK CIRCUIT

Filed Oct. 27, 1954 5 Sheets-Sheet 1

INVENTOR.
ERNEST H. GATZERT
BY J. Warren Whitesel
ATTORNEY

Sept. 24, 1957 E. H. GATZERT 2,807,673

SPECIAL SERVICE TRUNK CIRCUIT

Filed Oct. 27, 1954 5 Sheets-Sheet 2

Sept. 24, 1957 E. H. GATZERT 2,807,673

SPECIAL SERVICE TRUNK CIRCUIT

Filed Oct. 27, 1954 5 Sheets-Sheet 4

TRUNK CIRCUIT 105

United States Patent Office 2,807,673

Patented Sept. 24, 1957

2,807,673

SPECIAL SERVICE TRUNK CIRCUIT

Ernest H. Gatzert, Rochester, N. Y., assignor, by mesne assignments, to General Dynamics Corporation, a corporation of Delaware Application October 27, 1954, Serial No. 464,975

8 Claims. (Cl. 179—27)

This invention relates to trunk circuits and more particularly to trunk circuits for providing special services.

A standard and universal numbering plan is desirable for electro-mechanical telephone systems because it provides means for connecting a plurality of exchanges into a common network wherein the same number may be dialed at any point in the network to call a given subscriber and because it develops good subscriber habits, such as always dialing a full complement of numbers, for example. On the other hand, one, two, or three digits may be all that are necessary to complete certain type of calls, such as to information, long distance or other special operators, for example. If the subscriber is to be required to dial a full complement of digits on these certain calls, it is necessary to provide either a special circuit to absorb the unused digits or to provide additional ranks of switches so that all digits may be used. Of these two alternatives, it is obvious that a special digit absorbing circuit is more economical. Another element of consideration is that it may be desirable to transfer a call from one operator to another. For example, a calling subscriber may have originally seized a toll operator position and then may have to be transferred to an information operator. In this case, it would be economical to reuse the special digit absorbing equipment to control transfer. Thus, it is seen that one trunk circuit may provide all functions necessary to the completion of certain special calls.

One object of this invention is to provide a new and improved trunk circuit.

Another object of this invention is to provide a new and improved trunk circuit adapted to give access to special services equipment.

Yet another object of this invention is to provide a trunk circuit adapted to prevent the seizure of equipment responsive to a subscriber dialing error.

A further object of this invention is to provide a trunk circuit which gives access to special services equipment responsive only to a full complement of digit pulses.

Still another object of this invention is to provide a trunk circuit using equipment to provide access to special services equipment and then reusing this same equipment to provide for call transfer.

These and other objects are accomplished by means of a trunk circuit provided with means for receiving and counting several trains of digit pulses. If any pulse train includes other than a predetermined number of pulses or if less than a predetermined number of pulse trains are received, the call is not completed because the calling subscriber has made a dialing error; however, if the proper digits are received, they are absorbed and the trunk circuit is switched through to the special services equipment.

It is thought that the invention will be clear from the following description of the drawings in which:

Fig. 1 shows, by block diagrams, a typical telephone system using this invention, the heavily inked box 105 indicating that portion of the system which is shown in detail in the remaining figures;

Figs. 2–5, when joined in the manner shown in Fig. 6, show the details of the special services trunk circuit shown in Fig. 1 by hollow rectangle 105; and Fig. 6 shows the manner in which the drawings should be joined to provide a complete and operative disclosure.

The exchange battery is shown by plus (+) and minus (−) signs. As is conventional in most telephone systems ground is described as connected to the (+) terminal of the battery. It should be understood that this or any other suitable arrangement which may be obvious to those skilled in the art could be used.

Digit absorbing is a term of art which is used hereinafter to mean the elimination of certain digit pulse trains. The digit absorbing process uses up unnecessary digits which are inserted into directory numbers—usually for the purpose of providing a universal numbering scheme. This is distinguished from the process by which digits in a directory number are used up as part of a selecting process for extending the call from one switching rank to the next.

Briefly, Fig. 1 shows a trunking diagram that is useful in explaining the subject invention. For example, subscriber A may call either subscriber C or special services equipment which is indicated by numeral 106. To initiate either of these calls, subscriber A picks up his receiver thereby causing line circuit 100 and allotter 101 to cooperate and direct line finder 102 to search for and seize the calling line. Subsequent thereto, selector 103 returns dial tone and subscriber A responds by transmitting any suitable number of digit pulses depending upon the directory number designating the destiny of the call. For example, if the call is to subscriber C, subscriber A transmits digits suitable to set selector 103 and connector 104, after which subscriber station C is seized and signaled. On the other hand, if the call is for a special services circuit, selector 103 is set to seize trunk circuit 105. Means is provided in trunk circuit 105 to absorb a certain number of predetermined digits before special services equipment 106 is signaled. This tends to eliminate faulty operation due to subscriber errors.

The dashed lines forming box 106 are intended to show the location within a system of various special services equipment which may be seized from a calling line. For purposes of illustration only, several specific services are shown, i. e., a reverting call switch, intertoll dialing equipment and various operator positions. It should be understood that these or other services could be provided; therefore the generic label "other special services equipment" is applied to one of the hollow boxes in dashed lines 106. Various other elements may be provided, as required to complete the special services equipment. For example, in the case of the intertoll dialing equipment or toll operator position, conductor 110 and trunk circuit 107 may be used to call distant office 108, while in other cases, conductors 111—113 may be used to obtain access to various local switches.

DETAILED DESCRIPTION

Figures 1, 6:
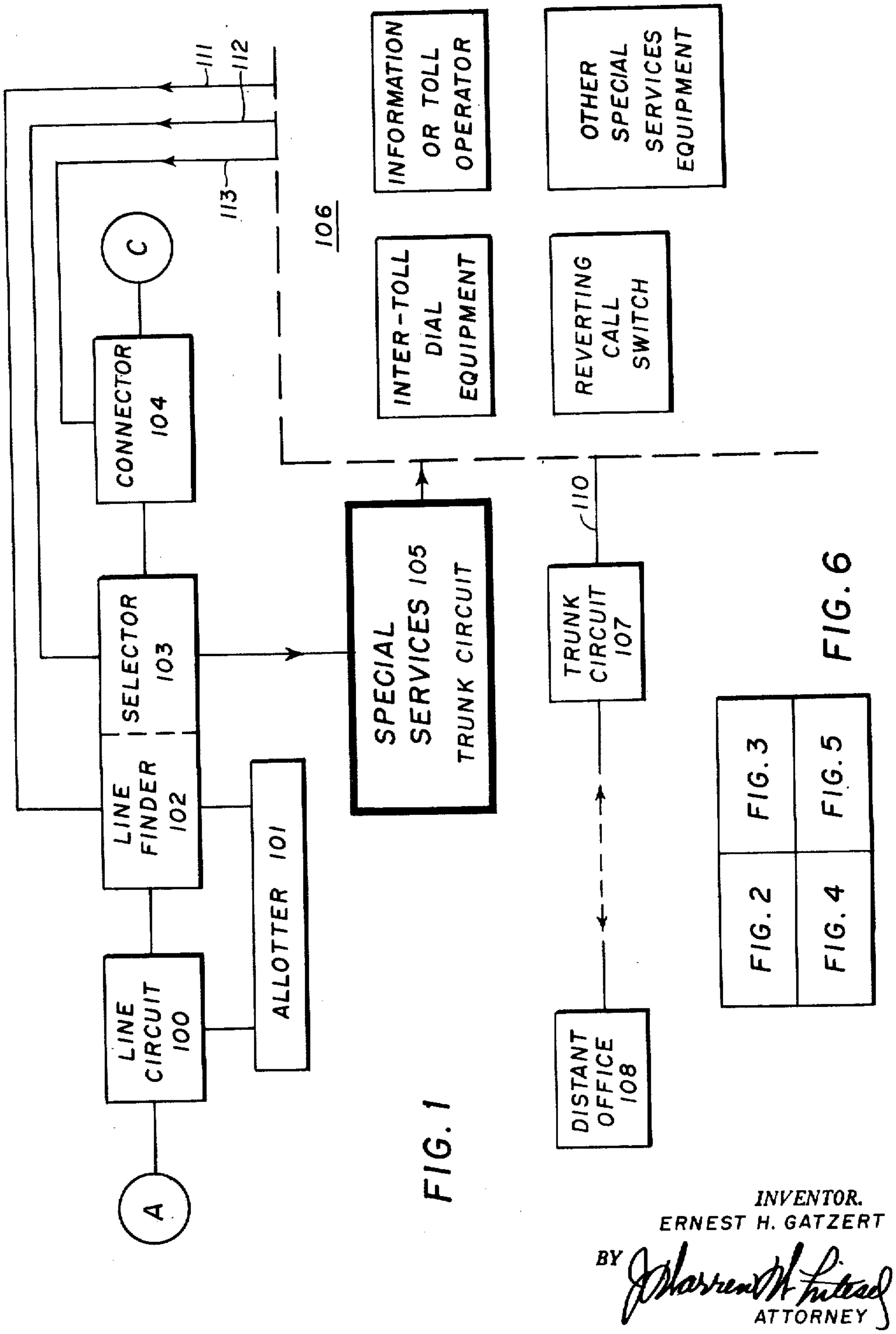
Figure 2:
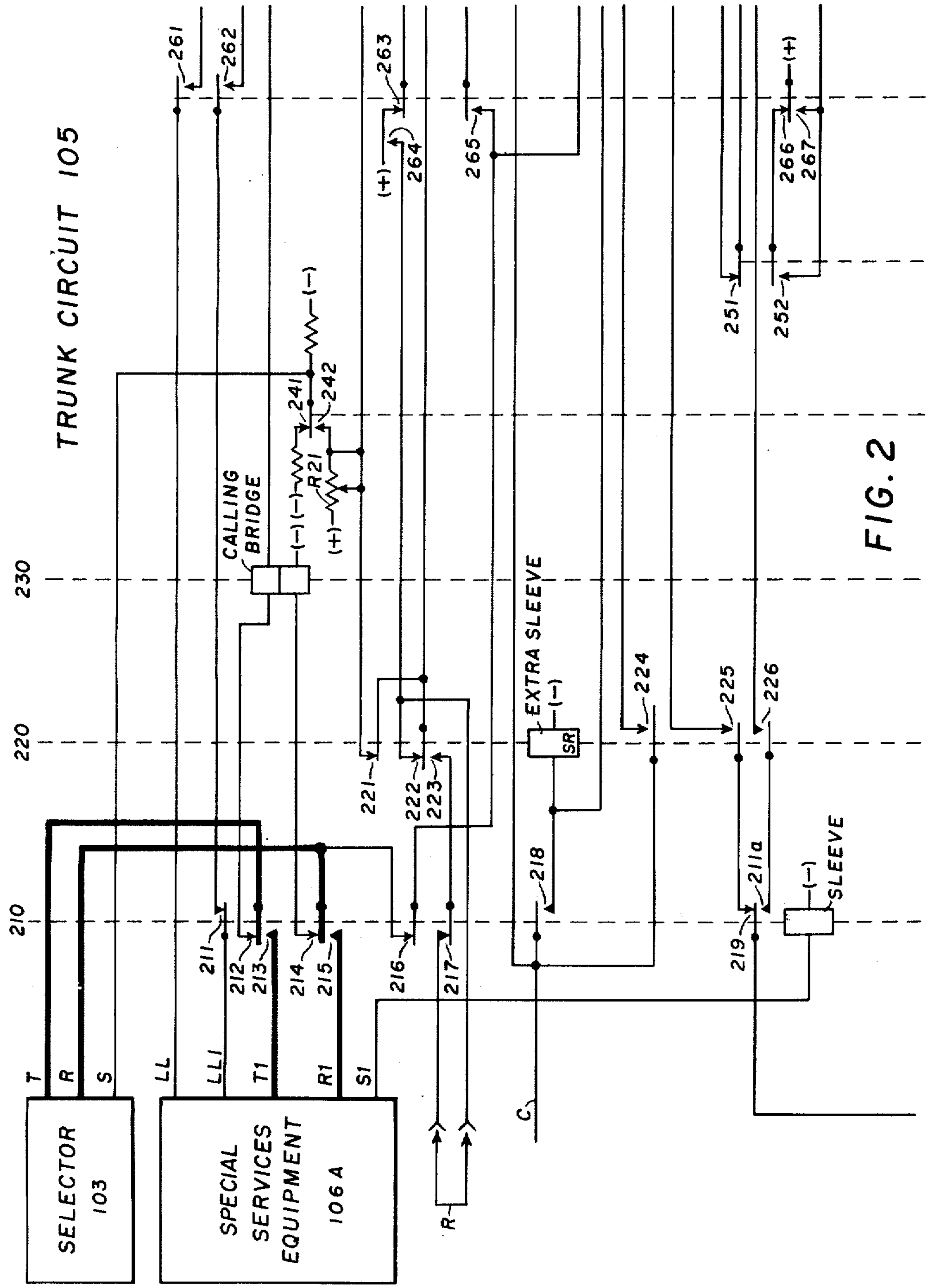
Figure 3:
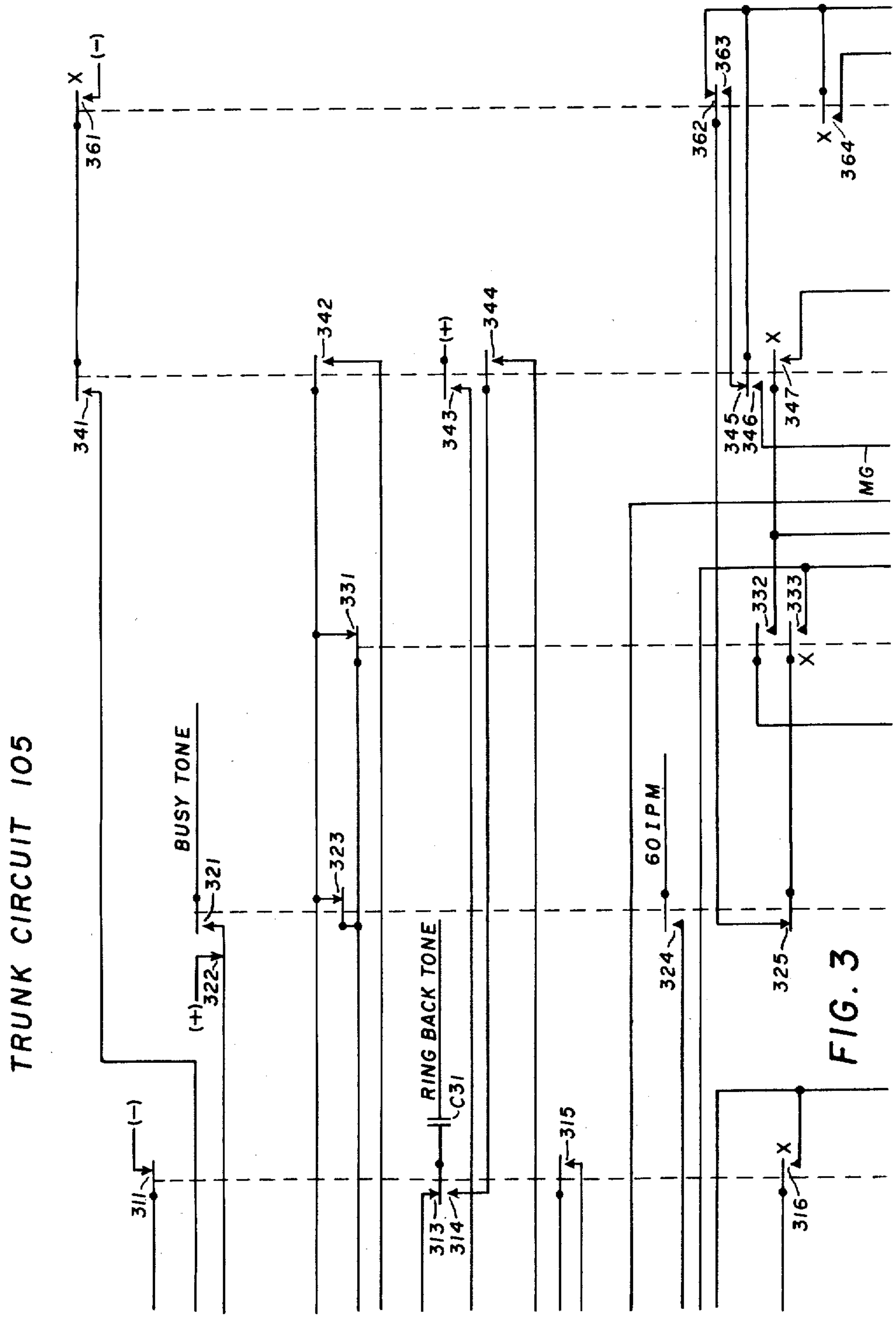
Figure 4:
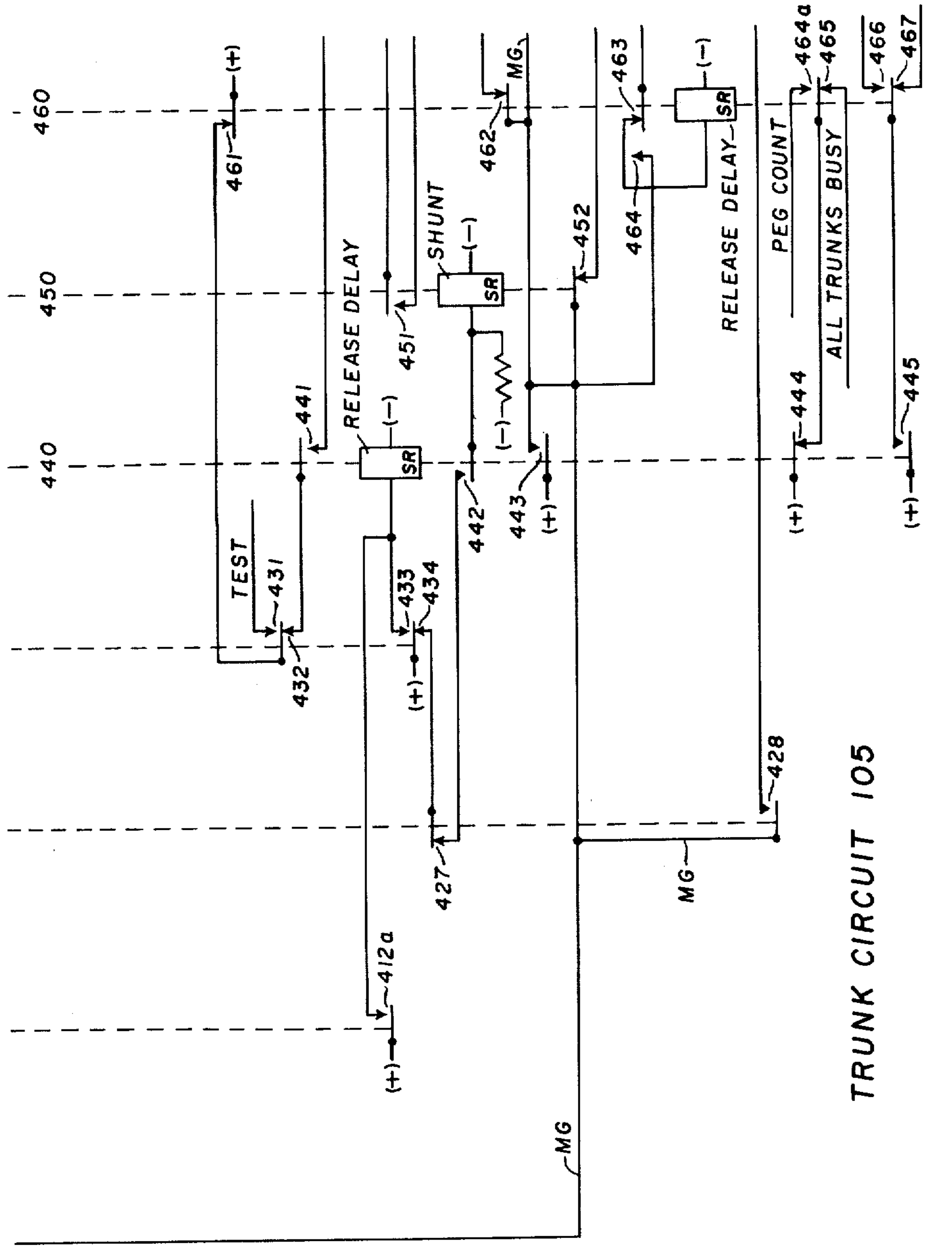
Figure 5:
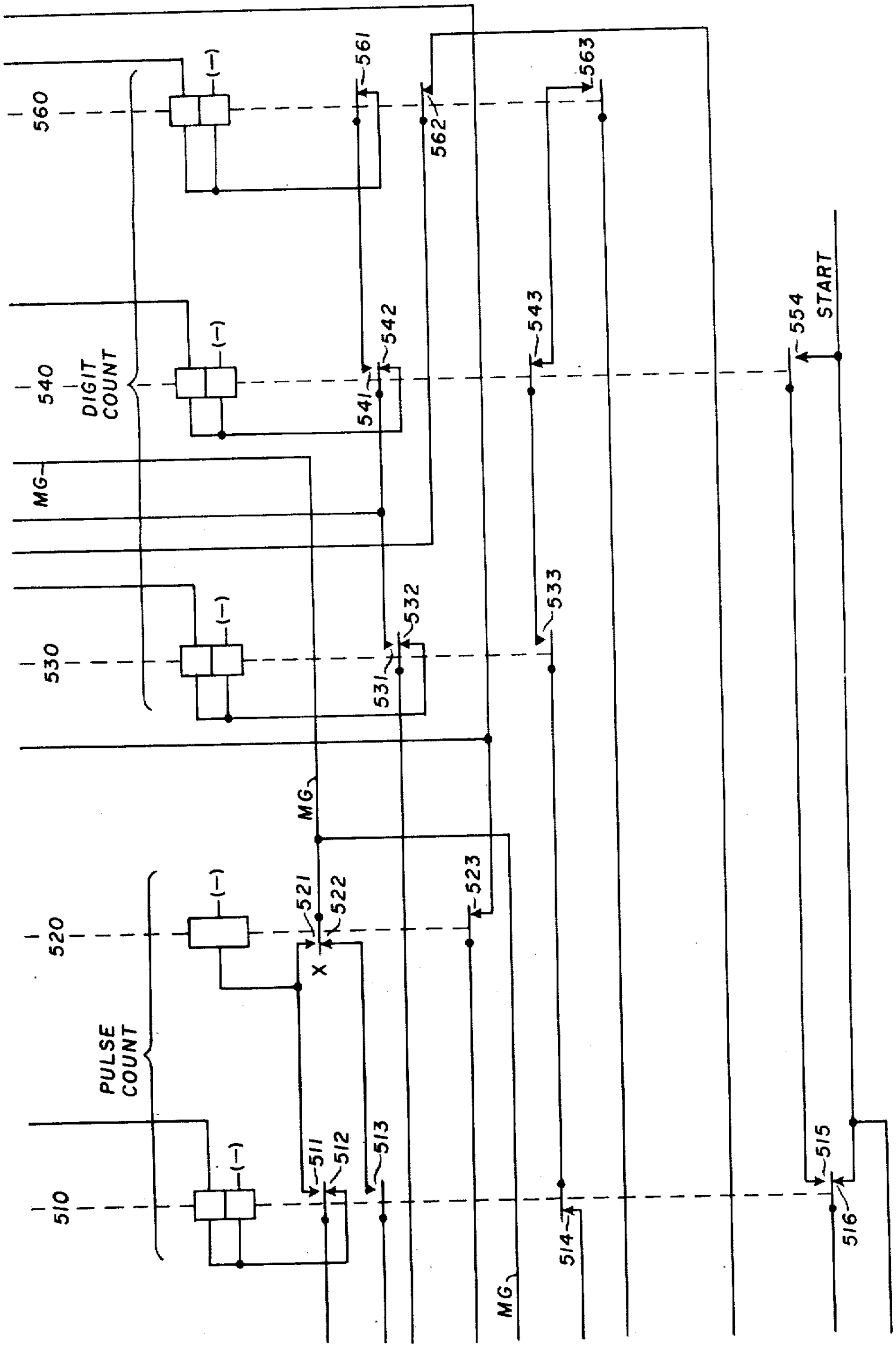

It is thought that a more complete understanding of this invention will be had from the following detailed description of Figs. 2–5 which show details of the circuit shown in Fig. 1 by means of hollow rectangle 105. It is assumed that subscriber A has removed his receiver and that line circuit 100 and allotter 101 have cooperated to cause finder 102 to search for and seize the calling line. Responsive thereto, selector 103 transmitted dial tone and subscriber A responded by dialing a proper digit to seize trunk circuit 105. At this point, conductors T and R, which are shown in the upper left corner of Fig. 2, are seized.

*Seizure.*—Calling bridge relay 230 operates over the loop across conductors T and R. The purpose of this relay is to provide means for seizing the trunk circuit, for responding to and repeating digit pulses, and for furnishing battery to the calling subscriber until the call is switched through. The circuit for this operation may be traced from (−) battery, through the lower winding of relay 230, contacts 214, conductor R, the loop through switch train and the calling subscriber's telephone equipment, conductor T, contacts 212, and the upper winding of calling bridge relay 230 to ground (+) applied through contacts 322. Responsive to its operation, calling bridge relay 230 closes a circuit to operate release delay relay 440. The purpose of this relay is to hold the switch train throughout pulsing and to provide for certain supervisory functions such as furnishing master ground to hold trunk circuit 105 operated. The circuit for operating release delay relay 440 extends from ground (+) on operated contacts 433 to (−) battery through the winding of release delay relay 440.

When release delay relay 440 operates, sleeve conductor S is switched at contacts 241 and 242 from a (−) battery marking to ground (+) thereby marking trunk circuit 105 busy to other equipment and extending a holding ground to prevent the release of preceding equipment. This marking extends from sleeve S over contacts 242, 323 and 331 (in parallel) to ground (+) on contacts 263. Contacts 441 prepare a path for relay 510; however, there is no effect until the receipt of digit pulses at which time calling bridge relay 230 will fall to close contacts 432. Contacts 442 close to prepare shunt relay 450; however this path is also ineffective until calling bridge relay 230 drops to close contacts 434. Contacts 443 close to apply ground (+) to control most of the relays in the trunk circuit. For that reason, this ground marking is called master ground hereinafter and the conductor to which it connects is called "MG" or the master ground conductor. Contacts 444 open to remove a marking from the all-trunks-busy conductor. The purpose of this conductor is to record the number of times or duration of periods when all trunks in a group are busy, i. e., each trunk circuit of this type removes a ground (+) marking from the all-trunks-busy conductor. When the last is removed, the all-trunks-busy conductor is open and a suitable meter is operated so that a traffic survey is always available to insure the installation sufficient equipment. The circuit is now ready to receive the first digit pulse train which is preferably the digit "1."

*Dialing.*—The trunk circuit is now ready to receive digit pulses. Each pulse that is received is in the form of a brief period during which the loop to the calling subscriber is broken by any suitable impulse transmitting device. This is commonly called open loop pulsing. Calling bridge relay 230 is released and reoperated responsive to each open loop pulse. A slow release shunt relay 450 operates on the first release of relay 230 and then depends upon its slow release characteristics to hold itself operated throughout the remainder of the digit train. At the end of each train, the shunt relay releases because it receives no further energization during its slow release period. Its purpose is to mark the end of each digit pulse train. The circuit for operating shunt relay 450 includes contacts 442, 427 and 434, the last being the back or pulsing contacts on calling bridge relay 230 that operate and control relay 450. It might be noted also that release delay relay 440 is de-energized during each open loop pulse; however it too remains operated throughout pulsing due to its slow release characteristics. The difference between relays 440 and 450 is that release delay relay 440 operates responsive to make contacts on calling bridge relay 230 so that there is energizing current during interdigit time while shunt relay 450 operates responsive to break contacts 434 so that it is de-energized during the interdigit time interval.

Pulse count relays 510 and 520 are arranged to count the number of pulses in each digit pulse train. As pointed out before, the trunk circuit may be arranged to receive and count any number of digit pulses; however, the circuit shown is arranged to count only one pulse and it is assumed that the number 1111 is received by the trunk circuit. The first pulse count relay 510 operates on the first pulse and if a second pulse is received in the same pulse train, relay 520 operates and busy tone is returned. If it should become necessary to count two or more pulses per train, it would be necessary to add duplicates of relay 510 before relay 520, for example, a chain of three relays could be provided as is done in the case of relays 530 and 560.

In greater detail, on the first pulse, two-step relay 510 half-operates. The circuit is from (−) battery through the lower winding on relay 510, contacts 512, 441, 432 and 461 to ground (+). This closes the preliminary or "X" contacts 316. Following the first digit pulse train, after calling bridge relay 230 reoperates and before shunt relay 450 releases, the upper winding of relay 510 is fully energized over the circuit from ground (+), through contacts 266, 252, "X" contacts 316, the upper and lower windings of pulse count relay 510 in series, to (−) battery. Responsive thereto, all of the contacts of relay 510 operate fully. It might be noted that before relay 230 reoperates the upper winding of relay 510 is ineffective because it is shunted over the circuit from ground (+) through contacts 266, 252, 316, 512, 441, 432 and 461 to ground (+). When this shunt path is broken at contacts 432, relay 510 fully operates as noted above. Contacts 314 and 315 have no function at this time. Contacts 511 prepare a circuit for the second pulse count relay 520; however, since it is assumed that only one digit pulse is received, these contacts are of no effect. Their purpose together with that of relay 520 is to prevent further operation if any digit other than the predetermined one is received. For further information on this feature, see the section entitled "Faulty Operation." Contacts 512 open to break the original operating path for pulse count relay 510, while contacts 514 open to break any possible operating path for release delay relay 460.

A circuit is now completed during the remainder of the brief interval of shunt relay 450's slow release time for operating a first digit count relay 530. The purpose of relays 530, 540 and 560 is to count the digit pulse trains so that the trunk circuit may not switchthrough if a full quota of digit pulse trains are not received. The circuit for operating relay 530 extends from (−) battery, through the lower winding of relay 530, contacts 532, 451, 513, 522, master ground conductor MG and contacts 443 to ground (+).

When digit count relay 530 half-operates, it closes its preliminary or "X" contacts 333. This keeps it from fully operating since ground is then applied to both sides of the upper winding. The circuit for this feature may be traced from ground (+), through contacts 443, master ground conductor MG, contacts 462, 523, 362, 325, preliminary or "X" contacts 333, the upper winding of relay 530, contacts 532, 451, 513, 522 and 443 to master ground (+). Immediately upon the release of shunt relay 450, one of these circuits is opened at contacts 451 and relay 530 operates fully over the circuit which may be traced from (−) battery, through the lower and upper windings of relay 530 in series, preliminary contacts 333, rest contacts 325, 362, 523, 462 and 443 to master ground (+). All of the contacts of relay 530 now operate. Contacts 331 are ineffective since contacts 323 are in parallel therewith and they remain closed. Contacts 332 prepare a locking path for relay 540. Contacts 531 close to prepare an operating path for relay 540 which will operate on the next digit pulse. Contacts 533 have no effect at this time.

*Second digit.*—The circuit stands ready for the receipt of the next digit pulse train (assumed to be a single pulse) from a calling subscriber's station. Relay 530 is operated as an indication that one digit pulse train has been received. Both relays 510 and 520 are released. Responsive to the second digit, calling bridge relay 230 releases and reoperates once more since it is assumed that the digit "1" is received. Again, as in the case of the first pulse train, shunt relay 450 operates and releases as does pulse count relay 510. However, this time first digit count relay 530 is operated and so the operation of pulse count relay 510 closes a circuit to half-operate second digit count relay 540. A circuit for this operation extends from (−) battery through the lower winding of relay 540, contacts 542, 531, 451, 513, 522 and 443 to master ground (+). As in the case of relay 530 explained above in the section headed "Dialing," relay 540 closes its "X" or preliminary contacts 347. The upper winding of relay 540 is shunted so that it does not fully operate. The shunt circuit includes contacts 443, 462, 523, 332, 347, 542, 531, 451, 513, 522 and 443.

When shunt relay 450 releases at the end of the second digit pulse train, it opens its contacts 451 and relay 540 fully operates over the circuit from (−) battery, the lower and upper winding of relay 540 in series, contacts 347, 332, 523, 462 and 443 to master ground (+). Contacts 341—345 have no effect at this time. Contacts 346 prepare a special locking path for relay 560 for a purpose that will be explained later. Contacts 541 close to prepare the circuit for third digit count relay 560 and contacts 543 open to prevent any possible operation of release delay relay 460 at this time.

*Third digit*.—Responsive to the receipt of the third digit pulse train (assumed to be a single pulse) to be transmitted into the trunk circuit, relay 560 operates in the manner described above for relays 530 and 540. Digit count relay 560 is now locked in an operated position. Its locking circuit may be traced from (−) battery, through its lower and upper windings in series, preliminary or "X" contacts 364, contacts 523 and 462 and 443 to master ground (+). Contacts 361 and 363 have no effect at this time. Contacts 362 open the locking circuit for relay 530. It releases. This circuit was formerly traced from (−) battery, through the lower and upper windings of relay 530 in series, "X" or preliminary contacts 333, contacts 325, 362, 523, 462 and 443 to master ground (+). Contacts 562 open one possible holding path for digit count relay 540 which is of no effect at this time.

When digit count relay 530 releases, contacts 332 open thereby releasing second digit count relay 540. Its locking path formerly extended from (−) battery, through the lower and upper windings of relay 540 in series, contacts 347, 332, 523, 462 and 443 to master ground (+).

*Fourth digit*.—When the fourth digit pulse train (again assumed to be a single pulse) is received by the trunk circuit, relay 510 operates again from ground (+), over contacts 461, released calling bridge relay contacts 432, operated contacts 441, released contacts 512, and the lower winding of pulse count relay 510 to (−) battery. Relay 510 operates in two steps and causes digit count relay 530 to reoperate in the manner described in the section entitled "Dialing." At this time, digit count relay 560 is locked-operated and digit count relay 540 is released. Therefore, digit count relay 530 locks over the path including contacts 333, 325, 363, 345, 523, 462 and 443 to master ground (+). On termination of the digit pulse, release delay relay 460 is operated. That is, after shunt relay 450 releases, contacts 252 open so that pulse count relay 510 releases. This closes contacts 514.

Release delay relay 460 operates over the circuit including contacts 463, 563, 543, 533, 514, 452 and 443 to master ground (+). Since digit count relays 530 and 560 are locked in an operated position while relay 540 is released, relay 460 then locks at its contacts 464 to master ground (+) on contacts 443. Contacts 261 close thereby extending a (−) battery marking from contacts 311 over contacts 261 to mark conductor LL for seizing special services equipment 106a. Conductor LL1 is ineffective at this time since relay 540 is released and contacts 341 are open. Contacts 264 close to extend a new holding and busy marking to preceding equipment via the circuit from ground (+) on contacts 264 over contacts 222, 221, 242 and sleeve conductor S. Ring back tone is returned as an indication to the calling subscriber that the special-feature equipment has been seized and is being signaled. This circuit extends from the ring back tone generator over capacitor C31, contacts 313, 265, 216 and conductor R to the calling substation. Contacts 266 and 267 operate to by-pass contacts 252 as will be explained in connection with the section on "Transfer." Contacts 461 open to prevent possible reoperation of relay 510 when calling bridge relay 230 releases following switchthrough. Contacts 462 open to release any digit count relays that may be operated, in this case relays 530 and 560. Contacts 466 and 516 maintain a marking on the start conductor. Contacts 464a prepare for peg count when release delay relay 440 releases.

*Seizure*.—The special services equipment responds in any suitable manner to the marking on conductor LL. For example, conductor LL could lead to a light at an operator's switchboard and she could respond by making a simple plug and jack connection. In any event, sleeve conductor S1 is marked by ground (+) and sleeve relay 210 operates from this marking. The purpose of this relay is to provide for supervision and control from special services equipment 106a. The circuit is obvious. Contacts 211 are to break conductor LL1 when it is used. Contacts 212 and 214 open to remove calling bridge relay 230 from its connection across the line. Contacts 213 and 215 close to complete the talking connection between subscriber A and special services equipment 106a. Contacts 216 open to remove ring back tone. Contacts 217, 219 and 211a operate for a purpose that is explained below in the section entitled "Transfer." Contacts 412a close to hold release delay relay 440 operated after calling bridge relay 230 falls. Contacts 218 close to operate extra sleeve relay 220.

The C conductor is an additional control conductor which is also marked by ground; hence, extra sleeve relay 220 operates over contacts 218. Contacts 222 open to remove the direct ground busy and holding marking formerly extended over sleeve conductor S, i. e., the path from ground (+), over contacts 222, 221, 242 and sleeve conductor S. The preceding equipment is now held by ground (+) extended through resistor R21. This switching of sleeve conductor S from direct to resistance ground provides an answer supervision to the preceding equipment. Extra sleeve relay 220 locks operated over the following circuit: (−) battery, contacts 315, 224 and the C conductor to ground (+). Relay 510 reoperates over the circuit from (−) battery through its lower and upper windings in series, contacts 226, 211a and 443 to master ground (+).

Reviewing briefly, the trunk circuit was seized in any suitable manner. Following that, relays in the trunk circuit counted and registered each of four digit pulse trains which for the purposes of this description were assumed to be four single digit pulses. When these were registered, the trunk circuit switched through. It is fairly certain that four digit pulse trains of one pulse each would not be transmitted inadvertently due to subscriber error.

Conversation follows.

*Faulty operation*.—Assume that the digit "1" was transmitted less than the proper number of times responsive to faulty operation of the dial at the calling subscriber's station. The subscriber would have dialed some digit other than "1" before registration of the fourth digit pulse by digit count relays 530 and 560. If this should happen, the calling bridge relay would be pulsed at least twice before shunt relay 450 is released. On the first pulse a circuit is completed from ground (+) on contacts 461, to release contacts 432, operated contacts 441, release contacts 512, to (−) battery through the lower winding of relay 510. This relay operates to close its "X" or preliminary contacts 316; however, it does not operate any further due to the fact that the upper winding is then shunted, all in the manner described above in the section entitled "Dialing." Following release of the calling bridge relay, pulse count relay 510 operates fully and closes its contacts 511. However, before shunt relay 450 can release and in turn restore relay 510, a second digit pulse is received by calling bridge relay 230; hence, contacts 432 close a second time.

A circuit is now completed from ground (+) through contacts 461, 432, 441 and 511 to (−) battery through the winding of pulse count relay 520 which operates and locks to master ground via contacts 521, master ground conductor MG and contacts 443. Contacts 321 close to return a busy tone through the upper winding of calling bridge relay 230, contacts 212 and tip conductor T to preceding equipment because it is obvious that there has been a subscriber error in dialing. The calling subscriber hangs up and makes the call at a later time. Contacts 323 have no effect at this time. Contacts 324 close and after shunt relay 450 finally releases to close contacts 251 at the end of the digit pulse train, 60 impulses per minute are applied over contacts 324, 251 and the upper and lower windings of relay 530 in series to operate it alternately responsive to 60 impulses per minute. Since contacts 323 are held operated due to the locked condition of pulse count relay 520 and since contacts 342 are open because relay 540 is not operated or if operated is released when contacts 332 open, contacts 331 open and close at the rate of 60 impulses per minute thereby alternately connecting a ground (+) marking to sleeve conductor S via contacts 263, 331 and 242, thus notifying any operator that may have been connected through selector 103 of the fact that the switching equipment has encountered a busy signal.

*Transfer.*—Occasionally, an operator at special services equipment **106*a* may wish to transfer the call to a different operator. Briefly, the operator at position 106*a* first pushes a button which removes and reapplies ground to sleeve conductor S1. Then she disconnects her plug and jack arrangement which once more removes ground from sleeve conductor S1. Following this, another operator may seize trunk circuit 105**—which is as if a new call is being answered for the first time. The principle involved is that sleeve conductor S1 is caused to be opened and closed twice, or, stated another way, two open pulses are transmitted. The various counting relays are reused to count these two pulses and responsive thereto the trunk circuit is prepared for a transfer operation.

In greater detail, the operator pushes a button which removes ground from sleeve conductor S1 while leaving ground on conductor C. Extra sleeve relay 220 remains operated due to the locking path from (−) battery, through contacts 315 and 224, to ground (not shown) on the C conductor. Sleeve relay 210 releases. Contacts 212 and 214 close while contacts 213 and 215 open responsive to restoration of sleeve relay 210. This reoperates calling bridge relay 230. Contacts 433 close before release delay relay 440 has had an opportunity to restore. With sleeve relay 210 released and extra sleeve relay 220 operated, a circuit is completed for operating digit count relay 540. This circuit may be traced from (−) battery, through the lower winding of relay 540, contacts 542, 225, 219 and 443 to master ground (+). Relay 540 operates to its "X" contact only because ground is applied to both sides of its upper winding over the path including contacts 443, 219, 225, 542, 347, 562, 428 and 443. When the operator releases her transfer key and ground is reapplied to sleeve conductor S1, relay 540 fully operates over a circuit which may be traced from (−) battery, through its lower and upper windings in series, contacts 347, 562, 428 and 443 to master ground (+) because sleeve relay 210 reoperates and contacts 219 open thereby breaking the shunt to the upper winding.

The operator at equipment **106*a* proceeds to unplug and once again conductor S1 is opened. As in the previous case, sleeve relay 210 releases. Extra sleeve relay 220 remains locked in an operated position due to the circuit which extends from (−) battery, through the winding of relay 220, contacts 315, 224 and 343 to ground (+). This time a circuit is completed for reoperating relay 560 as follows: (−) battery, through the lower winding of relay 560, contacts 561, 541, 225, 219 and 443 to master ground (+). Relay 560 operates to its first step and closes its "X" contacts 364; however, nothing further happens at this time since ground is applied to both sides of the upper winding over a circuit which may be traced from master ground (+) on contacts 443, through contacts 219, 225, 541 and 561, through the upper winding of relay 560, preliminary contacts 364, contacts 346 and 443** to master ground (+).

A second operator at special services equipment **106*a* may connect with the line terminating conductors T1 and R1. Responsive thereto, sleeve relay 210 reoperates a third time. During the interval between the time that the first operator released or unplugged and the second operator plugged in, ring back tone was supplied to the calling subscriber through contacts 314, 344, 216 and ring conductor R. This tone is an indication to the calling subscriber that he should remain connected with the line. Another seizure signal is transmitted from contacts 361, 341, 262, 211 and auxiliary seizure conductor LL1. Contacts 361 are "X" or preliminary contacts because two-step digit count relay 560 has not fully operated at this time. When the operator at the transfer position answers the call by plugging in to conductors T1 and R1, sleeve relay 210 reoperates. This in turn opens contacts 219 to remove the ground (+) marking from the upper winding of relay 560 which operates fully over the circuit from (−) battery, through its two windings in series, its "X" contacts 364, contacts 346 and 443 to master ground (+). When contacts 562 open, relay 540 is released. Responsive thereto, contacts 346 open and relay 560** is released.

*Release.*—After the call is complete, the circuit is released when the operator or other special services equipment removes the ground marking from sleeve conductors S1 and C simultaneously and without previously removing ground from sleeve S1 only, as is done in the case of transfer. This releases both of the relays 210 and 220—relay 540 not having been previously operated as an indication of transfer. Digit count relay 540 may operate to its first step during the slow release time interval of relay 220; however, this is of no effect because the circuit for completing the operation of relay 540 is open at contacts 428. Also, half-operation of relay 540 is not enough to close contacts 343 in order to lock relay 220 operated. Contacts 212 and 214 close to reconnect calling bridge relay 230 with conductors T and R. It reoperates until the calling subscriber hangs up at which time it releases. Contacts 433 release relay 440 which in turn opens master ground (+) contacts 443. With this ground marking removed, all relays then operated are released and the circuit is normal and ready for the next call.

MISCELLANEOUS

Several features have not been explained since their function is obvious to those skilled in the art and since they are not material to the invention. For example, contacts 431 repeat dial pulses to a "test" conductor so that maintenance personnel may check the operation of calling bridge relay 230. The "R" wiring is to provide an optional supervision feature. For example, during transfer, sleeve relay 210 releases while extra sleeve 220 is locked operated; hence, a calling operator connected through selector 103 is given disconnect supervison when sleeve conductor S is switched from resistance ground (+) to direct ground. The resistance ground marking is from resistor R21 and through contacts 242 to sleeve conductor S, while the direct ground includes contacts 264, the R conductor, if supplied, contacts 217, 223, 342 and 242 to sleeve conductor S.

While I have shown a single embodiment of my invention, it should be understood that various modifications may be made without departing from the scope of the invention. For example, special services equipment 106 could be a reverting call switch or some other type of equipment; therefore, it is my intention to claim not only the specific circuit details that are shown but also to claim all modifications as may fall within the spirit of my invention.

What is claimed is:

1. In a telephone system comprising a calling subscriber line, means for transmitting successive trains of digit pulses over said subscriber lines, special services equipment and means for interconnecting said subscriber line and said special services equipment, means including a special services trunk circuit interposed in said connection between said interconnecting means and said special-feature-service equipment, said trunk circuit comprising means for counting and absorbing a predetermined number of said digit pulses in successive pulse trains, means responsive only to a complete complement of digit pulse trains for causing said trunk circuit to switch through, and means responsive to receipt of other than said predetermined member of digit pulses for returning busy tone to said calling subscriber line.

2. The telephone system of claim 1 and means for transferring said call after said switch through comprising means for successively opening and closing part of said connection from said trunk circuit to said special services equipment, means for reusing said digit pulse counting and absorbing means to count the number of times that said part of said connection is opened, and means responsive to said reuse for holding said trunk circuit during the time interval required for said transfer.

3. The telephone system of claim 2 wherein said digit pulse counting means comprises a plurality of counting relays.

4. The telephone system of claim 2 wherein said part of said connection comprises a sleeve conductor.

5. The telephone system of claim 2 wherein said digit counting means comprises a plurality of counting relays and said part of said connection comprises a sleeve conductor.

6. A trunk circuit comprising means for receiving digit pulses arranged in pulse trains, a plurality of digit count relays, a plurality of pulse count relays, means responsive to the receipt of said digit pulse for operating one of said pulse count relays, means responsive to the termination of each digit pulse train for operating one of said digit count relays, means for extending outgoing connections from said trunk circuit, means responsive only to the receipt of a correct number of digit pulses and digit pulse trains for causing said call to be switched through, means for opening part of said outgoing connections a predetermined number of times to indicate call transfer, and means for reusing said relays to count the number of times that said outgoing connections are opened on call transfer.

7. A telephone system comprising a trunk circuit and special services equipment, means in said trunk circuit for receiving digit pulses arranged in pulse trains, means for extending calls through said trunk circuit to said special services equipment, means in said trunk circuit for counting each digit pulse in said pulse trains, means in said trunk circuit for counting and absorbing a total number of pulse trains each comprising a predetermined number of digit pulses received by said trunk circuit, means responsive to the receipt of proper digit pulses arranged according to said predetermined number for causing said trunk circuit to switch through, means responsive to the receipt of improper digit pulses arranged other than according to said predetermined number for returning busy tone to a calling subscriber, means in said special services equipment for transmitting a plurality of control pulses into said trunk circuit, and means responsive to said transmitted pulses for holding said call while said special services equipment is switched to a different piece of equipment.

8. The telephone system of claim 7 wherein said counting means are reused to count said control pulses.

References Cited in the file of this patent

UNITED STATES PATENTS

| | | |
|---|---|---|
| 1,558,872 | Helwig | Oct. 27, 1925 |
| 2,155,933 | De Vriendt et al. | Apr. 25, 1939 |
| 2,710,311 | Kessler | June 7, 1955 |

UNITED STATES PATENT OFFICE

CERTIFICATE OF CORRECTION

Patent No. 2,807,673

September 24, 1957

Ernest H. Gatzert

It is hereby certified that error appears in the printed specification of the above numbered patent requiring correction and that the said Letters Patent should read as corrected below.

Column 9, line 24, for "special-feature-service" read -- special services --; line 30, for "member" read -- number --; column 10, line 17, for "opened" read -- open --.

Signed and sealed this 12th day of November 1957.

(SEAL)
Attest:

KARL H. AXLINE

Attesting Officer

ROBERT C. WATSON
Commissioner of Patents